United States Patent
Gao et al.

(10) Patent No.: US 8,773,959 B2
(45) Date of Patent: Jul. 8, 2014

(54) NEAR FIELD TRANSDUCER WITH SHAPED ENERGY RADIATING END

(71) Applicant: Seagate Technology LLC, Cupertino, CA (US)

(72) Inventors: Kaizhong Gao, Eden Prairie, MN (US); Yongjun Zhao, Eden Prairie, MN (US); William A. Challener, Eden Prairie, MN (US); Xuhui Jin, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/777,095

(22) Filed: Feb. 26, 2013

(65) Prior Publication Data
US 2013/0170332 A1 Jul. 4, 2013

Related U.S. Application Data

(63) Continuation-in-part of application No. 12/785,003, filed on May 21, 2010, now Pat. No. 8,385,159.

(51) Int. Cl.
*G11B 11/00* (2006.01)

(52) U.S. Cl.
USPC .................................. 369/13.33; 369/112.27

(58) Field of Classification Search
USPC .......... 369/13.33, 13.32, 13.24, 13.14, 13.03, 369/13.02, 13.12, 13.13, 13.22, 13.01, 369/112.27
See application file for complete search history.

(56) References Cited

U.S. PATENT DOCUMENTS

| | | | |
|---|---|---|---|
| 6,795,630 B2 | 9/2004 | Challener et al. | |
| 7,155,732 B2 | 12/2006 | Rausch et al. | |
| 7,266,268 B2 | 9/2007 | Challener et al. | |
| 7,272,079 B2 | 9/2007 | Challener | |
| 7,330,404 B2 | 2/2008 | Peng et al. | |
| 7,412,143 B2 | 8/2008 | Rottmayer et al. | |
| 7,440,660 B1 | 10/2008 | Jin et al. | |
| 7,864,635 B2 | 1/2011 | Shimizu | |
| 7,876,646 B2 * | 1/2011 | Tanaka et al. | 369/13.02 |
| 8,111,485 B2 * | 2/2012 | Freeman et al. | 360/264.2 |
| 8,248,891 B2 * | 8/2012 | Lee et al. | 369/13.17 |

(Continued)

FOREIGN PATENT DOCUMENTS

| | | |
|---|---|---|
| JP | 2007200505 A | 9/2007 |
| JP | 2008123689 A | 5/2008 |
| JP | 2010108584 A | 5/2010 |

OTHER PUBLICATIONS

Koji et al., Abstract of JP2007200505 (A), "Thin Film Magnetic Head Provided with Near-Field Light Generating Part Having Trapezoid End", 2 pages, Sep. 8, 2007.

Peng et al., Abstract of JP2008123689 (A), "Near Field Optical Transducer for Thermally Assisted Magneto Optical Data Recording", 2 pages, May 29, 2008.

(Continued)

*Primary Examiner* — Ali Neyzari
(74) *Attorney, Agent, or Firm* — HolzerIPLaw, PC

(57) ABSTRACT

A magnetic recording head consists of a write pole and a near field transducer close to the write pole that focuses light energy to a focal point. A near field transducer is positioned to receive light energy from a waveguide. The near field transducer comprises an energy-receiving end and an energy-radiating end. The energy-receiving end is located near the focal point of the waveguide and the energy-radiating end is shaped such that it is narrower closer to the write pole and wider farther from the write pole.

22 Claims, 16 Drawing Sheets

(56) References Cited

U.S. PATENT DOCUMENTS

| | | | |
|---|---|---|---|
| 8,351,307 B1 * | 1/2013 | Wolf et al. | 369/13.33 |
| 8,385,159 B2 * | 2/2013 | Gao et al. | 369/13.33 |
| 8,416,530 B2 * | 4/2013 | Gao et al. | 360/125.31 |
| 8,472,288 B1 * | 6/2013 | Wolf et al. | 369/13.33 |
| 2008/0158709 A1 | 7/2008 | Tanaka et al. | |
| 2010/0123965 A1 | 5/2010 | Lee et al. | |
| 2010/0123976 A1 | 5/2010 | Freeman | |
| 2011/0090588 A1 | 4/2011 | Gao et al. | |
| 2011/0235480 A1 | 9/2011 | Goulakov et al. | |
| 2011/0286127 A1 | 11/2011 | Gao et al. | |

OTHER PUBLICATIONS

Koji, et al., Abstract of JP2010108584 (A), "Surface Plasmon Antenna Having Propagation Edge, and Near-Field Light Generation Element", May 13, 2010.

Jun. 15, 2012 European Patent Application No. 11 167 004.8-2210.

Sep. 21, 2011 European Search Report, EPP16810A, European Application No. EP 11 16 7004.

Challener et al., "Heat-assisted magnetic recording be a near-field transducer with efficient optical energy transfer", Nature Photonics, Mar. 22, 2009, 5 pages.

* cited by examiner

NEAR FIELD TRANSDUCER WITH SHAPED ENERGY RADIATING END

PRIORITY CLAIM

This application is a continuation-in-part application of U.S. Non-Provisional patent application Ser. No. 12/785,003, entitled "NEAR FIELD TRANSDUCER WITH SHAPED ENERGY RADIATING END" and filed on May 21, 2010, which is incorporated by reference herein in its entirety.

BACKGROUND

Heat assisted magnetic recording (HAMR) generally refers to the concept of locally heating a recording medium to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information. Better designs are needed to increase efficiency, alignment, precision and reduced size of the local heating.

SUMMARY

A magnetic recording head comprises a write pole, a near field transducer positioned to receive light energy from an external source and positioned proximate the write pole. The near field transducer resonates to produce a heated spot on a recording medium. Asymmetries in the shape of the near field transducer proximate the recording medium result in shape anisotropies of the heated spot.

In another aspect, a magnetic recording head comprises a write pole, a near field transducer positioned proximate the write pole, and a recording medium disposed beneath the write pole and near field transducer. The near field transducer and recording medium form a resonant system that results in a heated spot on the recording medium. Asymmetries in the shape of the near field transducer proximate the recording medium result in shape anisotropies of the heated spot.

DETAILED DESCRIPTION

For heat assisted magnetic recording, an electromagnetic wave of, for example, visible, infrared, or ultraviolet light can be directed from the airbearing surface (ABS) of a recording head onto a surface of a data storage medium to raise the temperature of a localized area to facilitate switching. The main difficulty with HAMR has been discovering a technique that is able to conduct sufficient light energy into the storage medium to heat it by several hundred degrees, but only in the area that is desired to be recorded. If the optical spot is larger than this area, it will extend to neighboring bits and tracks on the disc, heat those areas as well, and the data recorded in those areas may be erased. Confining the optical spot to an area that is much smaller than a wavelength of light, and well below the so-called "diffraction limit" that can be achieved by standard focusing lenses, is an area of study called "near field optics" or "near field microscopy."

Well known optical waveguides such as solid immersion lenses (SILs), solid immersion mirrors (SIMs), and mode index lenses have been proposed for use in near field optics to reduce the size of a spot on the medium that is subjected to the electromagnetic radiation. SILs, SIMs, and mode index lenses alone are not sufficient to achieve focal spot sizes necessary for high areal density recording due to diffraction limited optical effects. Metal pins and other near field transducer (NFT) designs positioned at the focal point of the waveguide are used to further concentrate the energy and direct it to a small spot on the surface of the recording medium.

Figure 1:
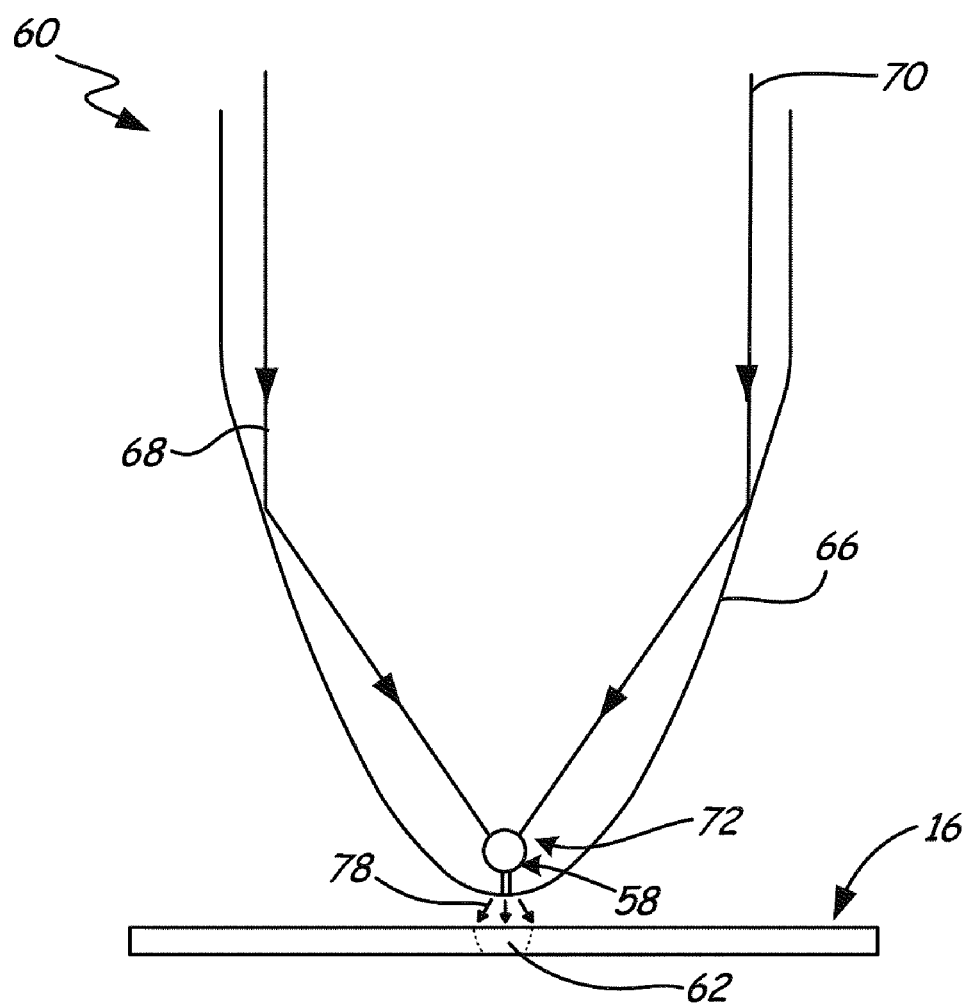
FIG. 1 is a schematic representation of a waveguide and a near field transducer (NFT) proximate an associated recording medium.

HAMR devices can incorporate various waveguides such as mode index lenses or planar solid immersion mirrors or lenses to generate focused beams. An example of a parabolic planar waveguide is shown in FIG. 1. Edge 66 of waveguide 60 is substantially parabolic in shape. If the refractive indices of material exterior to edge 66 are less than the indices of material of waveguide 60, waveguide 60 acts as a solid immersion lens. Electromagnetic waves 68 and 70 traveling along the longitudinal axis of waveguide 60 will be deflected at boundary 66 toward focal point 72 as shown. Diffraction gratings or other means known in the art to couple external energy into waveguide 60 can be configured to minimize radiation traveling down the center of waveguide 60 and maximize the energy reflected from parabolic edge 66, thereby increasing the energy content of the longitudinal component of waves 68 and 70 impinging on the focal point.

The dimensions of the spot concentrated at focal point 72 of waveguide 60 are diffraction limited and are not sufficient for the sub-100 nm dimensions required for high areal density HAMR recording media. Near field transducers (NFTs) such as metallic pins, sphere/pin, or disc/pin combinations are required to focus the energy to acceptable sub-100 nm spot sizes. Near field transducer 58 in FIG. 1 is an example of a disc/pin combination NFT. NFT 58 is positioned at focal point 72 of waveguide 60 where it can couple with incident waves 68 and 70 to generate surface plasmons. The fields generated by the surface plasmons on the NFT also interact with recording medium 16 and transfer electromagnetic energy into the medium as shown by arrows 78 that heat a small region 62 of recording medium 16.

Figure 2A:
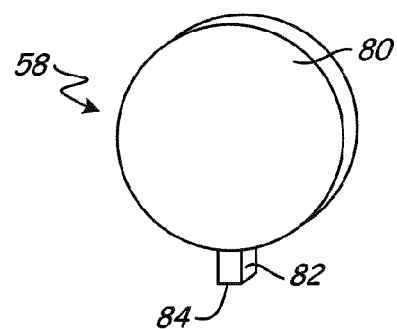
FIG. 2A is a perspective view of an optical near field transducer (NFT).

A perspective view of NFT 58 is shown in FIG. 2A. NFT 58 includes head 80, pin (sometimes referred to as "peg") 82 and pin tip 84. NFT 58 may be made of gold or other suitable materials known in the art such as silver or aluminum. Head 80 on NFT is generally disc-shaped, and is generally larger than pin 82. Head 80 also may have a greater thickness than pin 82. NFT 58 is shaped in a manner that can efficiently capture the optical energy and transfer that energy efficiently to the recording medium. Pin tip 84 ensures that the energy transferred to the medium remains confined to an area that is defined by the cross section of the pin. Traditional transducers have pins with rectangular cross sections as shown in FIG. 2A. Transducers such as that shown in FIG. 2A are sometimes termed lollipop transducers.

Figure 2B:
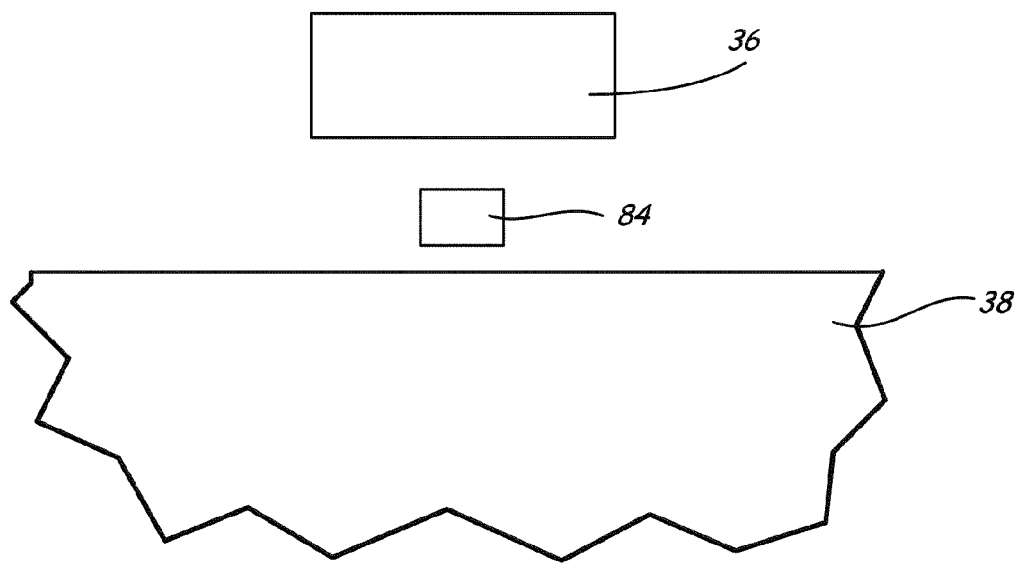
FIG. 2B is an air bearing surface (ABS) view of a NFT disposed between a write pole and a return pole.
Figure 2C:
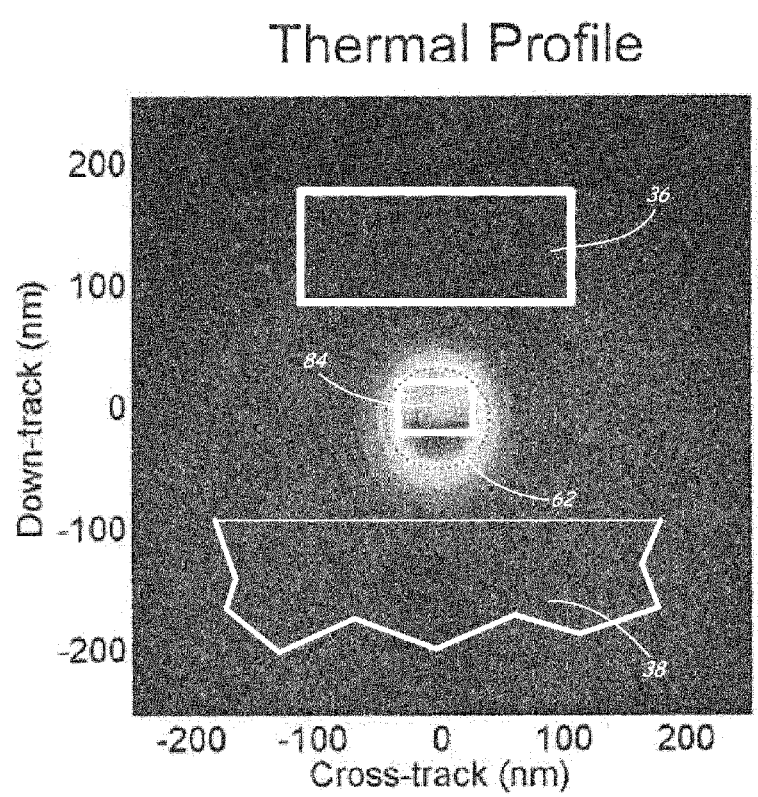
FIG. 2C is the thermal profile under a NFT.

A schematic ABS view of an optical transducer with a pin with a rectangular cross section is shown in FIG. 2B wherein write pole 36 is down-track of pin end 84 and return pole 38. It is desired to move the optical/thermal spot generated by pin end 84 closer to write pole 36 to achieve improved recording performance. The calculated optical field intensity distributions from optical modeling showing the temperature distribution in recording medium 16 resulting from laser light from NFT 58 with rectangular pin 82 is shown in FIG. 2C. Since the excitation laser light is incident on head 80 on the up-track side of NFT 58, optical/thermal spot 62 under rectangular pin tip 84 is closer to return pole 38 in the up-track direction and farther away from the write pole making thermal and magnetic alignment difficult. Pin 82 could be moved closer to write pole 36 but the resonant characteristics and thermal management during writing would be altered. In addition, producing pins with extremely small dimensions is challenging.

Figure 3A:
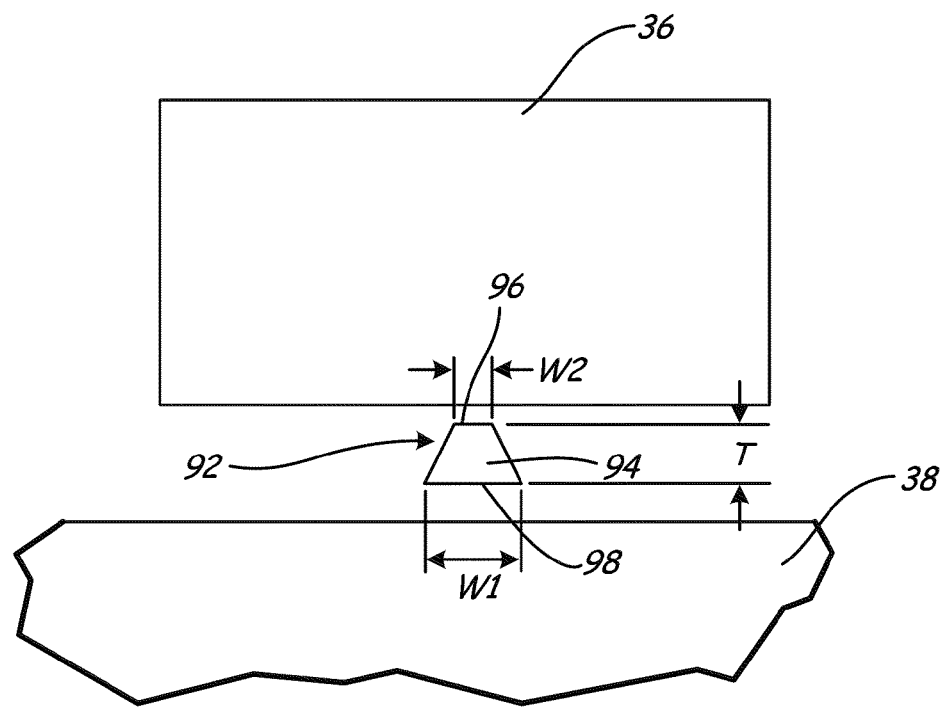
FIG. 3A is an ABS view of a NFT with an asymmetric pin disposed between a write pole and a return pole.

In an exemplary embodiment of this invention, the cross sectional shape of pin 82 has been changed in order to move the energy in the vicinity of pin tip 84 closer to write pole 36. One embodiment comprises a trapezoidal shape. FIG. 3A is a schematic ABS view of an optical transducer with pin 92, write pole 36, and return pole 38. Pin 92 is disposed between write pole 36 and return pole 38. Pin tip 94 is trapezoidal in shape, comprising first pin edge 96 and second pin edge 98. First pin edge 96 is smaller than second pin edge 98 and is closer to write pole 36 than second pin edge 98. In some embodiments, the optical transducer is a lollipop transducer.

Because first pin edge 96 is smaller in length than second pin edge 98, a higher charge density distribution will collect at first pin edge 96 because of the lightning rod effect of conductive materials. The lightning rod effect is a natural phenomenon that occurs for any sharp geometrical feature (corner or edge) of a conductive material. Quasi-electrostatic "crowding" of electric field lines at sharp geometrical features results in significant field enhancement. This effect occurs as long as the effective curvature of the feature is much smaller than the wavelength of interest. Thus, because first pin edge 96 is a sharp geometrical feature of pin 92, and because first pin edge 96 is located closer to write pole 36 than second pin edge 98, the asymmetry of the optical near field will be such that the maximum in the temperature profile of the thermal spot will be moved closer to write pole 36 and coincide with the magnetic field distribution more efficiently as compared to more conventional HAMR systems.

Figure 3B:
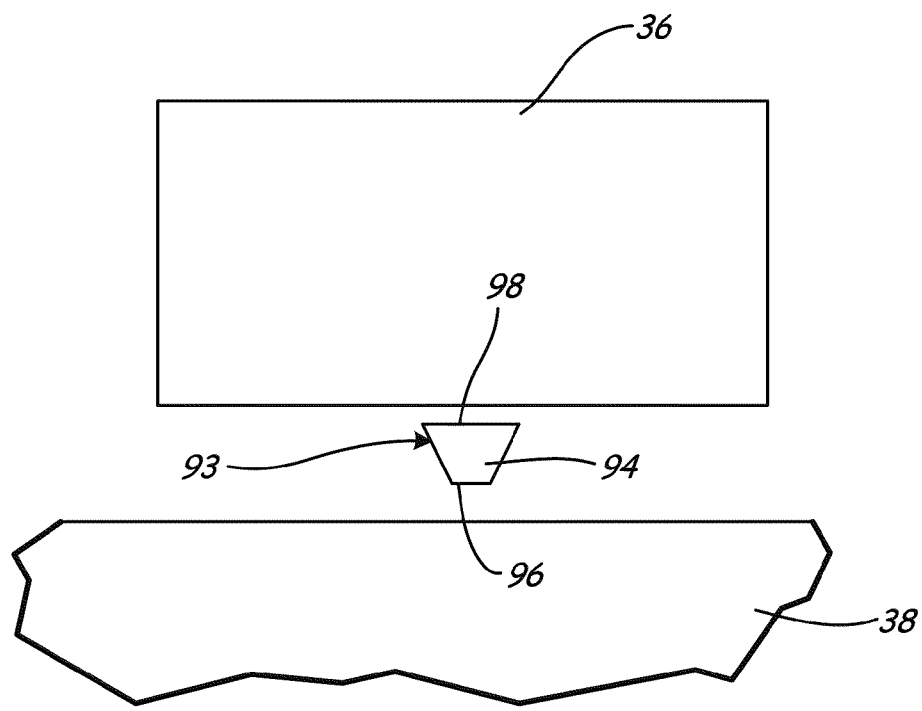
FIG. 3B is an ABS view of a NFT with a different asymmetric pin disposed between a write pole and a return pole.

FIG. 3B shows essentially the same structure as FIG. 3A, only pin 93 is oriented 180° from its position in FIG. 3A. Second pin edge 98 is now closer to write pole 36 than first pin edge 96. This orientation of pin 82 may be applicable for certain HAMR design criteria.

Figure 3C:
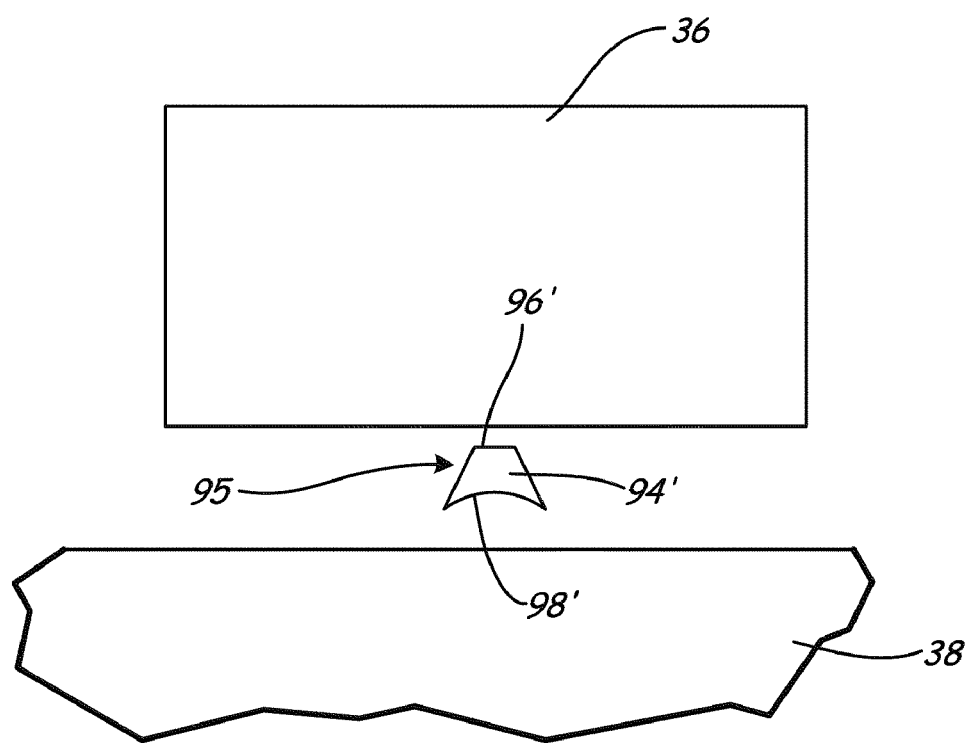
FIG. 3C is an ABS view of a NFT with a different asymmetric pin disposed between a write pole and a return pole.

FIG. 3C is a schematic ABS view of another embodiment of an optical transducer with pin 95, write pole 36, and return pole 38. FIG. 3C is essentially the same structure as FIG. 3A, only pin 95 now has straight pin edge 96' and curved leading edge 98', wherein the pin cross section at pin tip 94' is a concave trapezoid. Curved edge 98' can improve HAMR thermal and magnetic performance by focusing the thermal spot such that the hottest part of the thermal profile is moved closer to write pole 36.

The performance of optical NFT 58 with pin 94 shown in FIG. 3A has been evaluated by optical modeling of NFT recording on magnetic media. In the model, a gold lollipop NFT with a pin with trapezoidal cross section was integrated in a recording head with a solid immersion mirror (SIM) to focus waveguide light into the NFT. The waveguide comprised a 125 nm $Ta_2O_5$ core with alumina cladding. The NFT was placed in the cladding 10 nm away from the waveguide core. The magnetic medium disc comprised a 2.5 nm thick overcoat, 10 nm thick magnetic recording layer, and a 7.5 nm thick thermal barrier coating deposited on a glass substrate. The recording head had a 2.5 nm overcoat and the fly height was assumed to be 2.5 nm. The laser light had a wavelength of 920 nm.

Figure 4:
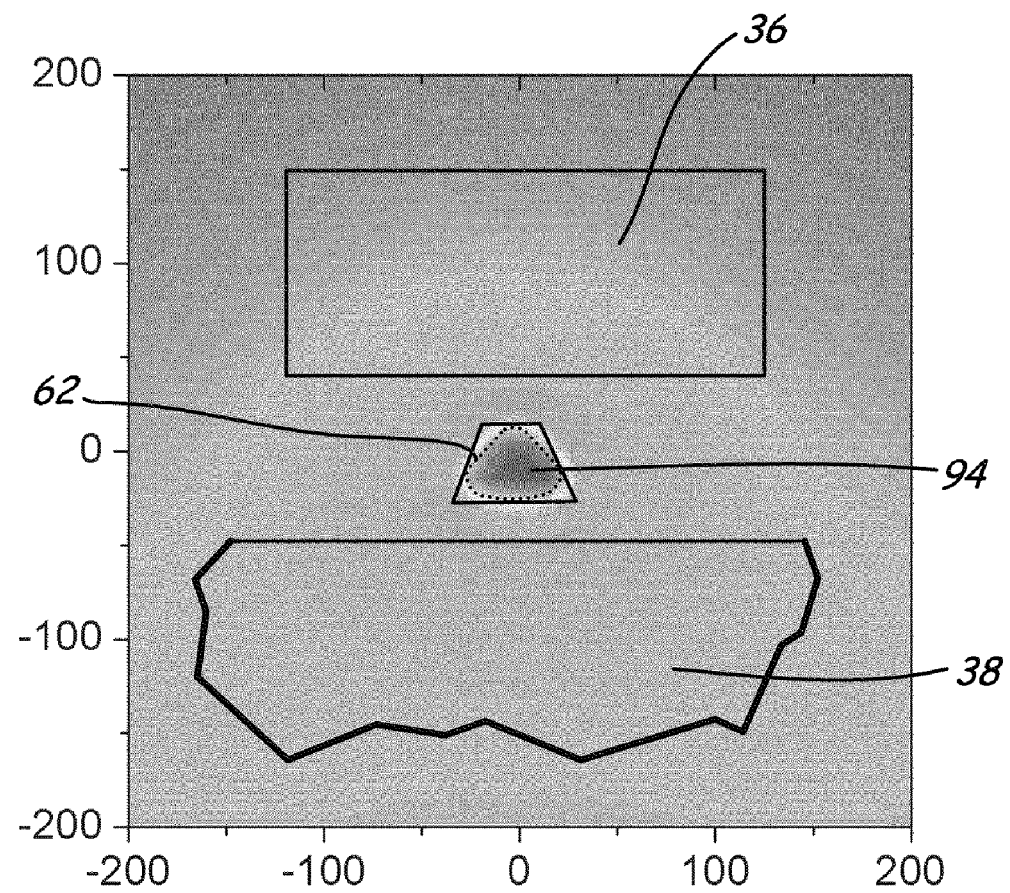
FIG. 4 is a thermal profile under a NFT with a trapezoidal pin.

The NFT dimensions, according to FIG. 3A are T=40 nm, W1=50 nm, and W2=10 nm. The calculated optical field intensity distributions showing the temperature distribution in recording medium 16 are shown in FIG. 4. In contrast to the temperature distribution shown in FIG. 2C, spot 62 under trapezoidal pin 94 has a distinct trapezoidal shape with a trailing edge noticeably closer to write pole 36 and a leading edge at the leading edge of pin 94. The temperature profile of the heated spot is shown as dotted line 62. The trapezoidal shape of pin cross section 94 has clearly moved the heated spot closer to write pole 36. The distance from the hottest part of the spot to the write pole in FIG. 4 is about 50 nm.

Figure 5A:
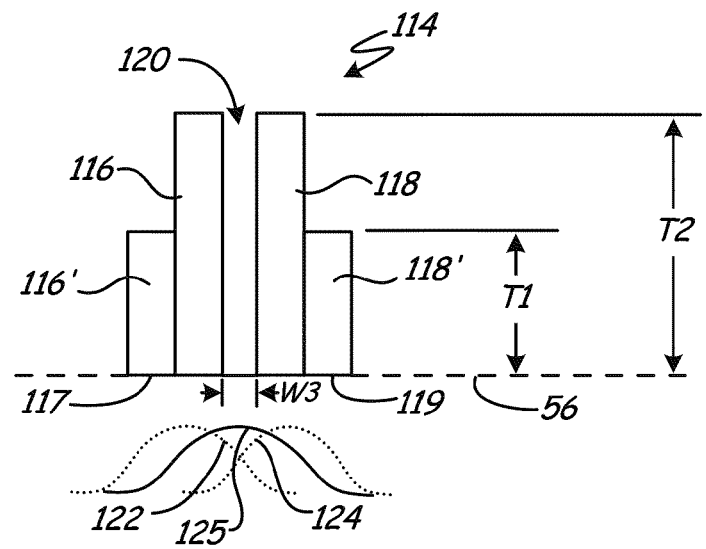
FIG. 5A is a schematic cross section of a coupled nanorod (CNR) and corresponding temperature distribution.

Another NFT suitable for HAMR application is a coupled nanorod. A coupled nanorod (CNR) comprises a pair of rod-like structures proximate each other, such that, when illuminated with electromagnetic energy of a proper wavelength, will resonate and generate an intense optical spot at the end of the CNR located between the ends of both rods. An example of a vertical cross section of a CNR is shown in FIG. 5A. CNR 114 comprises rods 116, 116', 118, and 118' separated by gap 120. When acting as a NFT in a HAMR transducer, CNR 114 is placed at a focal point of a waveguide such as focal point 58 in FIG. 3. CNR 114 resonates and surface plasmons on ends 117 and 119 of rods 116, 116', 118 and 118' respectively, heat recording media proximate the ABS 56.

The temperature profiles under ends 117 and 119 are schematically shown by temperature curves 122 and 124 respectively. The sum of curves 122 and 124 is shown as curve 125. The highest temperature is directly under gap 120 between the nanorods. Although CNR 114 is shown in FIG. 5A comprising 4 nanorods, CNR structures can be constructed of two or more nanorods as necessary. For HAMR applications, CNR NFT assemblies are typically thin film structures made of gold, silver, aluminum, or other materials known in the art.

Figure 5B:
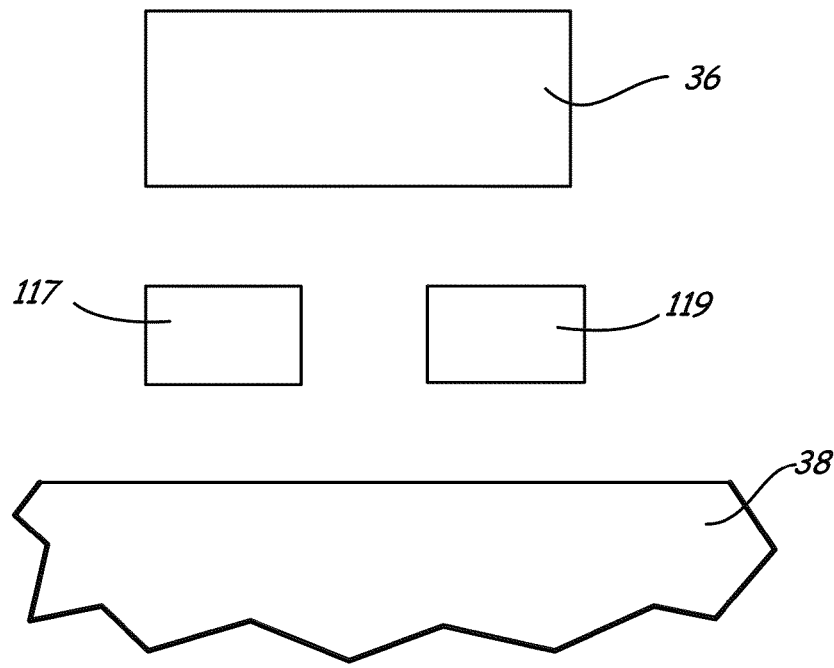
FIG. 5B is an ABS view of a CNR disposed between a write pole and a return pole.
Figure 5C:
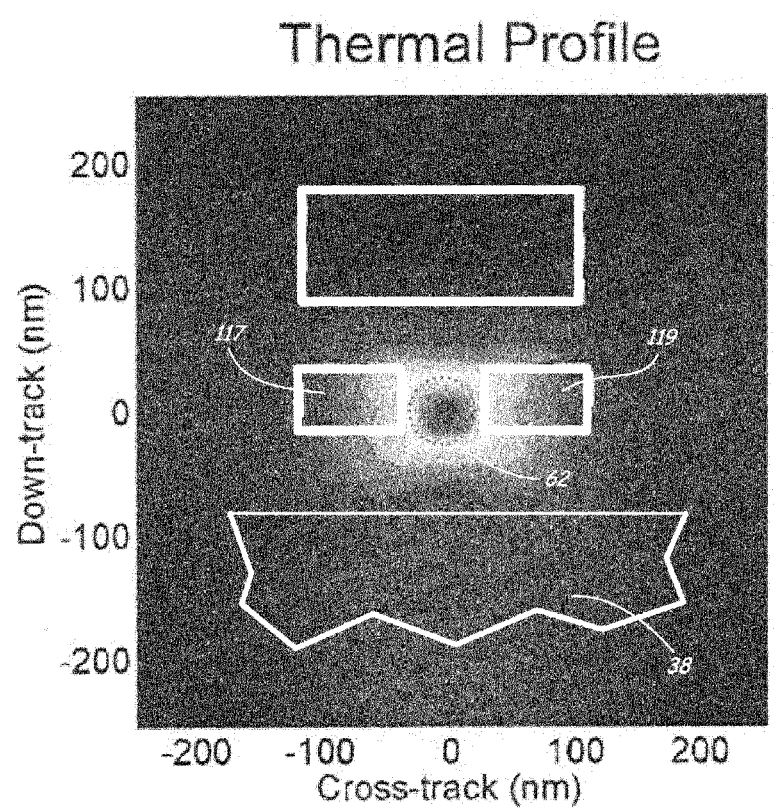
FIG. 5C is the thermal profile under a CNR.

A schematic ABS view of CNR 114 is shown in FIG. 5B wherein write pole 36 is down-track of ends 117 and 119 of CNR 114 and return pole 38. It is critical to move the optical/thermal spot closer to write pole 36 to achieve improved recording performance. A calculated thermal profile resulting from optical modeling showing the temperature distribution in recording media 16 from laser light from CNR 114 with rectangular ends 117 and 119 is shown in FIG. 5C. Optical/thermal spot 62 is closer to return pole 38 in the up track direction and farther away from writer pole 36 making thermal and magnetic alignment difficult. As discussed earlier, the thermal asymmetry results from the excitation laser light impinging on the up track side of CNR 114.

Figure 6A:
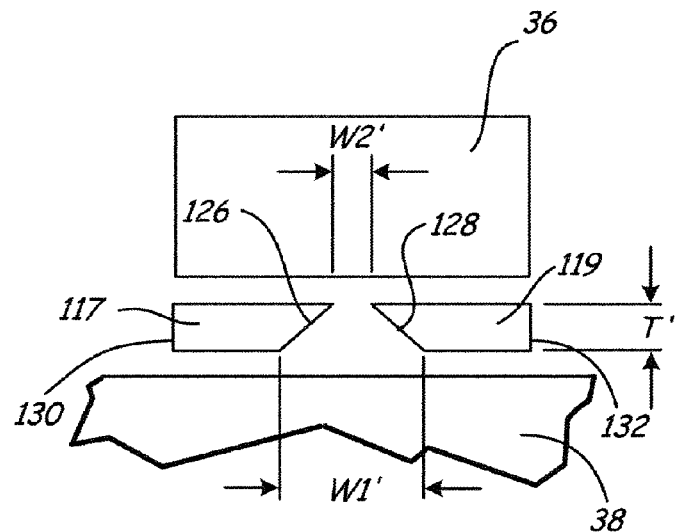
FIG. 6A is an ABS view of a CNR with asymmetric nanorods disposed between a writer pole and a return pole.

In an exemplary embodiment of this invention, the cross sectional shapes of rods 116, 116', 118 and 118' have been changed in order to move the energy in the gap closer to write pole 36. One embodiment comprises introducing gap 121 asymmetry in the down-track direction towards the write pole as shown in FIG. 6A. FIG. 6A is a schematic ABS view of CNR 114 showing asymmetric nanorod ends 117 and 119, write pole 36, and return pole 38.

Figure 6B:
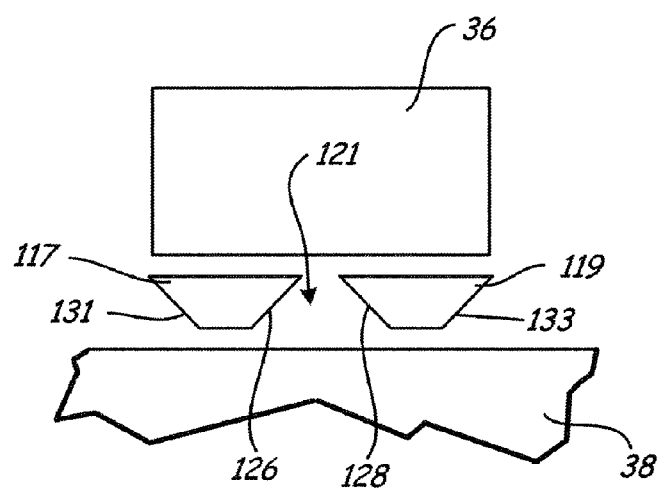
FIG. 6B is an ABS view of a CNR with different asymmetric nanorods disposed between a writer pole and a return pole.

First and second asymmetric nanorod tips 117 and 119 include first angled edge 126, second angled edge 128, and opposite edges 130 and 132. First angled edge 126 and second angled edge 128 are angled such that first and second nanorod tips 117 and 119 gradually grow farther apart away from pole 36. Opposite edges 130 and 132 are not angled. In another embodiment shown in FIG. 6B, edges 131 and 133 are also angled to create trapezoidal cross sections. Other asymmetrical cross sections of nanorods 116 and 118, not shown, are also included in this invention.

The NFT performance of CNR 114 with an asymmetrical gap has been evaluated by optical modeling of NFT recording on magnetic media. In the model, a coupled gold nanorod NFT was integrated in a recording head with a solid immersion mirror (SIM) to focus waveguide light into the NFT. The waveguide comprised a 125 nm $Ta_2O_5$ core with alumina cladding. The NFT was placed in the cladding 10 nm away from the waveguide core. The magnetic medium disc comprised a 2.5 nm thick overcoat, 10 nm thick magnetic recording layer, and a 7.5 nm thick thermal barrier coating deposited on a glass substrate. The recording head had a 2.5 nm overcoat and the fly height was assumed to be 2.5 nm. The laser light had a wavelength of 920 nm.

Figure 7A:
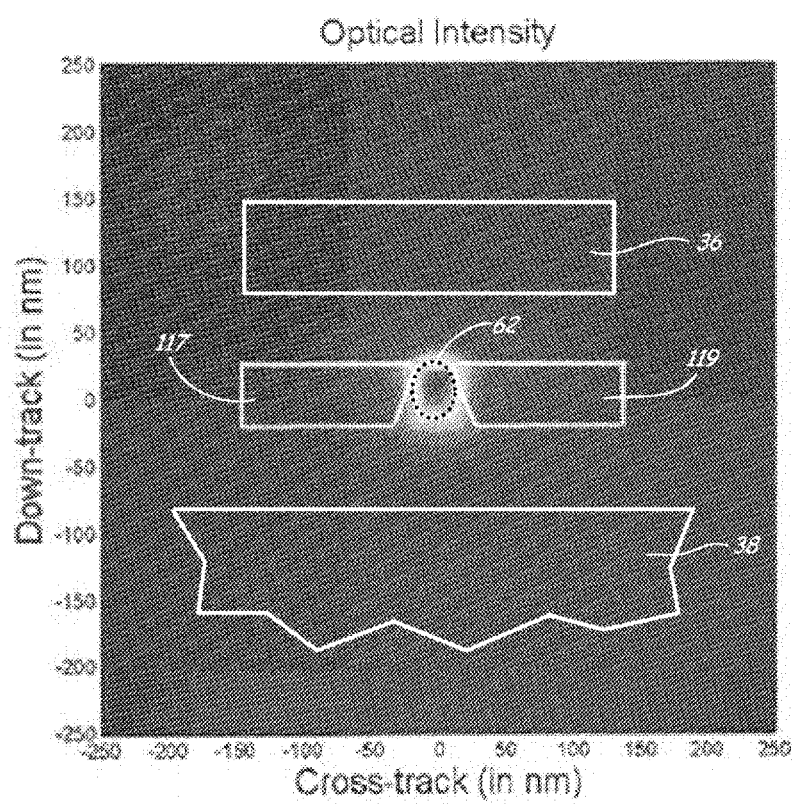
FIG. 7A is the thermal profile under a CNR with asymmetric nanorods.
Figure 7B:
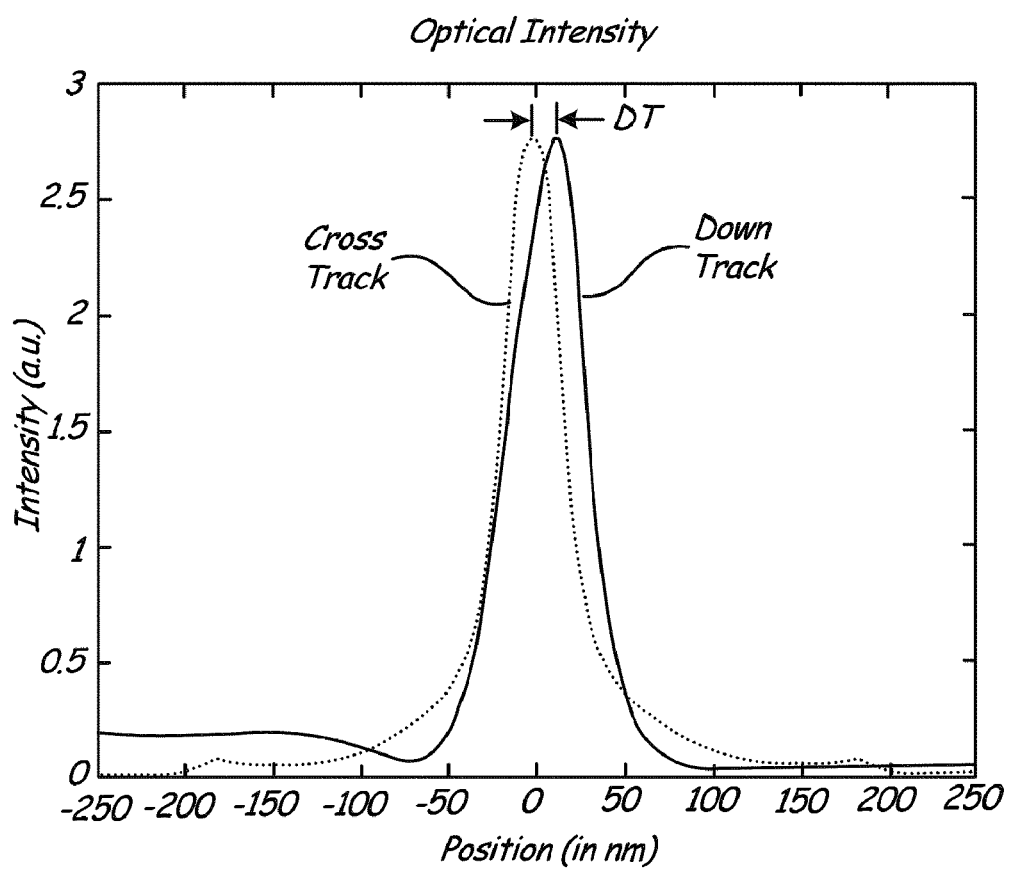
FIG. 7B is the cross track and down track optical profiles under a CNR with asymmetric nanorods.

Three nanorod dimensions were modeled. Referring to FIG. 6A, the dimensions were T'=40 nm, W1'=55 nm, and W2'=35 nm; T'=40 nm, Wi=45 nm, and $W_2$'=25 nm; and T'=30 nm, Wi=35 nm and $W_2$'=15 nm. In each case the optical intensity distributions were shifted in the down-track direction closer to the write pole due to the focusing effect of the asymmetric gap. The calculated optical field intensity and resulting temperature distributions, in the magnetic layer for the nanorod with T'=40 nm, $W_1$'=45 nm and $W_2$'=26 nm are shown in FIG. 7A. The cross-track and down-track intensity distributions are shown in FIG. 7B. The cross track intensity distribution, as shown by the dotted line, is symmetric about the center. The non-uniform field distribution in the gap is clearly evident in FIG. 7A as compared to the field distribution in the case of a rectangular gap shown in FIG. 5C. The distance from the hottest part of the spot to the write pole in FIG. 7A is about 60 nm. The down-track intensity distribution in FIG. 7B shows a definite peak shift toward the writer pole as indicated by arrows DT. The full width at half maximum (FWHM) of the cross-track profile was 35 nm. FWHM decreased from 45 nm to 25 nm as W2 decreased from 35 nm to 15 nm respectively. In addition, the down-track optical gradient increased when the spot size decreased with a narrower gap. This will benefit HAMR recording.

Calculations have shown that the propagation constants of plasmon modes in the gap increase exponentially as the gap width decreases. Thus, in a gap with decreasing width, the plasmons will be bent toward the smaller gap dimension as they travel from the top of the CNR toward ABS 56. As such, the asymmetric gap has a focusing effect. However, calculations also show that the plasmon propagation distance in a gap is proportional to the gap width. For a 5 nm gap, for example, the propagation distance is less than one micron. This problematic feature can be countered by the addition of a tapered gap along the gap plasmon propagation direction to the CNR. That is, along the vertical direction from the top of the CNR toward the ABS.

Figure 8:
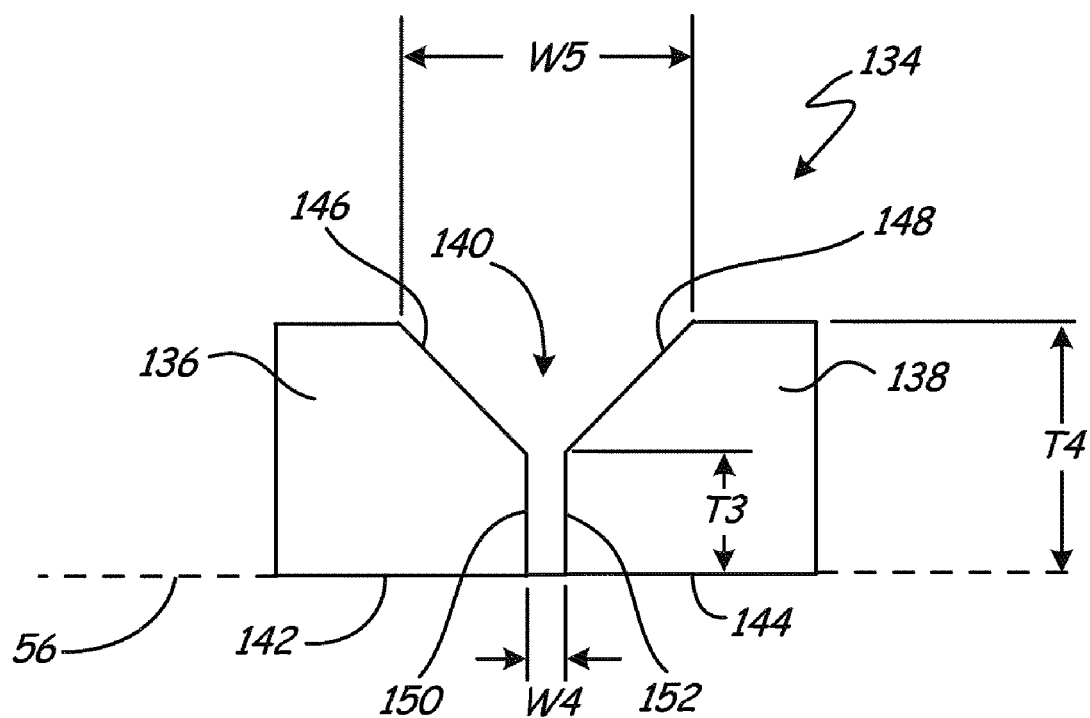
FIG. 8 is a vertical cross section of a CNR with a tapered entrance section in the gap.

A vertical cross section of CNR 134 with a tapered gap is shown in FIG. 8. CNR 134 comprises nanorods 136 and 138 with nanorod ends 142 and 144. Gap 140 with sides 146 and 148 is wide at the top and narrows to sides 150 and 152 at the bottom proximate the ABS. Plasmon loss in the narrow gap is offset by the larger plasmon energy in the upper gap. An added advantage of a tapered gap is that improved impedance matching between the exitation source (preferably a waveguide) and the NFT is possible by the design variable offered by the variable gap.

Figure 9A:
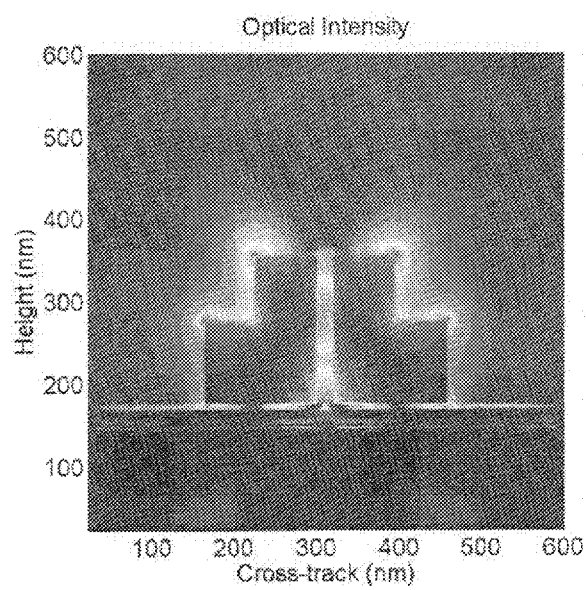
FIG. 9A is the optical intensity distribution of a CNR with a straight gap.
Figure 9B:
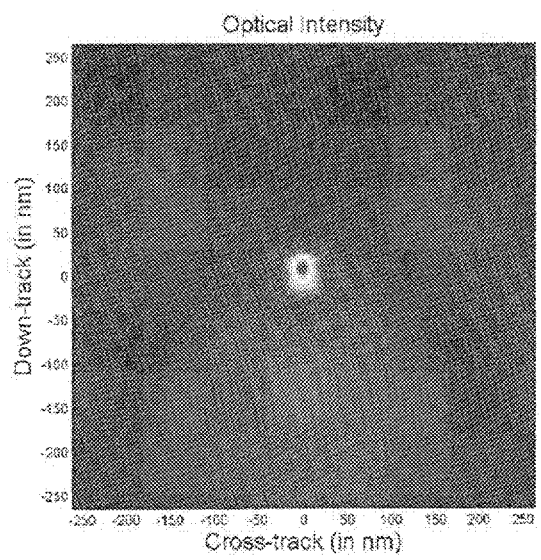
FIG. 9B is the optical intensity distribution under the CNR in FIG. 11A.
Figure 10A:
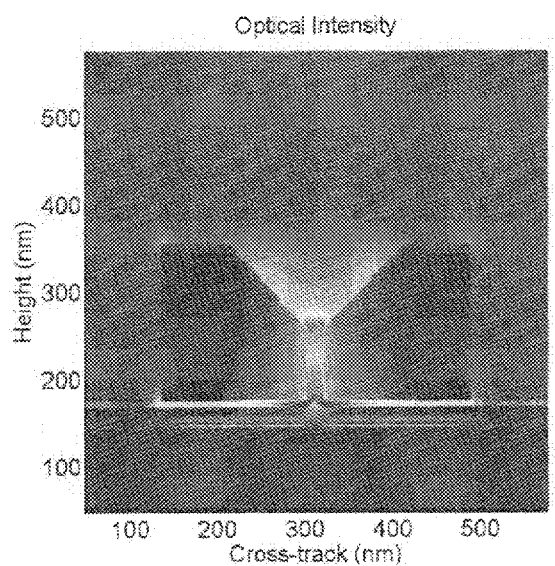
FIG. 10A is the optical intensity distribution of a CNR with a tapered gap.
Figure 10B:
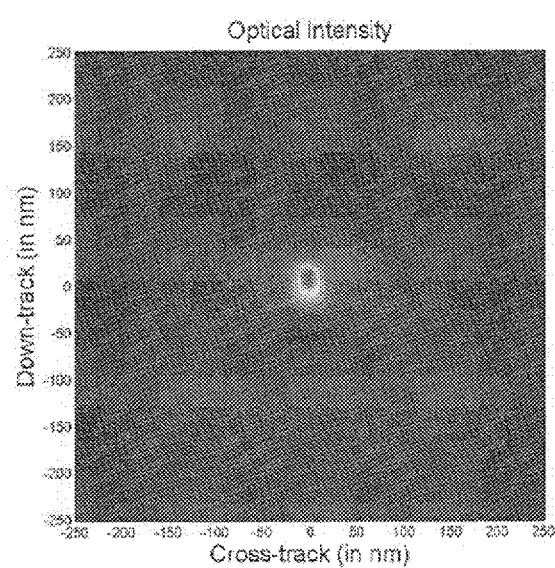
FIG. 10B is the optical intensity distribution under the CNR in FIG. 12A.

Optical field intensity calculations have been made for coupled nanorods with straight and tapered entrances to the gap. The optical intensity of a vertical cross section of CNR 114 (FIG. 5A) is shown in FIG. 9A. The dimensions of CNR 114 are W3=20 nm, T1=100 nm and T2=175 nm. FIG. 9B shows the optical intensity distribution at the ABS from CNR 114. The optical intensity of a vertical cross section of CNR 134 with the tapered gap (FIG. 8) is shown in FIG. 10A. The dimensions of CNR 134 are W4=20 nm, W5=195 nm, T3=90 nm and T4=170 nm. FIG. 10B shows the optical intensity distribution at the ABS from CNR 134. The energy of CNR 134 is distinctly confined to the gap in FIGS. 10A and 10B. Both spots at the ABS in FIGS. 9B and 10B are similar in size, however, the peak intensity is more than doubled when a tapered entrance is used.

Finally, in both pin type (e.g., lollipop) and gap type (e.g., CNR) NFTs with asymmetric pins and rods that move the optical spot closer to the leading edge of the writer pole, the thickness of the NFT can be increased by as much as a few hundred nanometers without affecting writing performance. The asymmetric pins and rods also cause the shape and size of the spots to be more efficient. Finally, the increased gold thickness aids in dissipating heat energy thereby reducing the NFT temperature.

Figure 11:
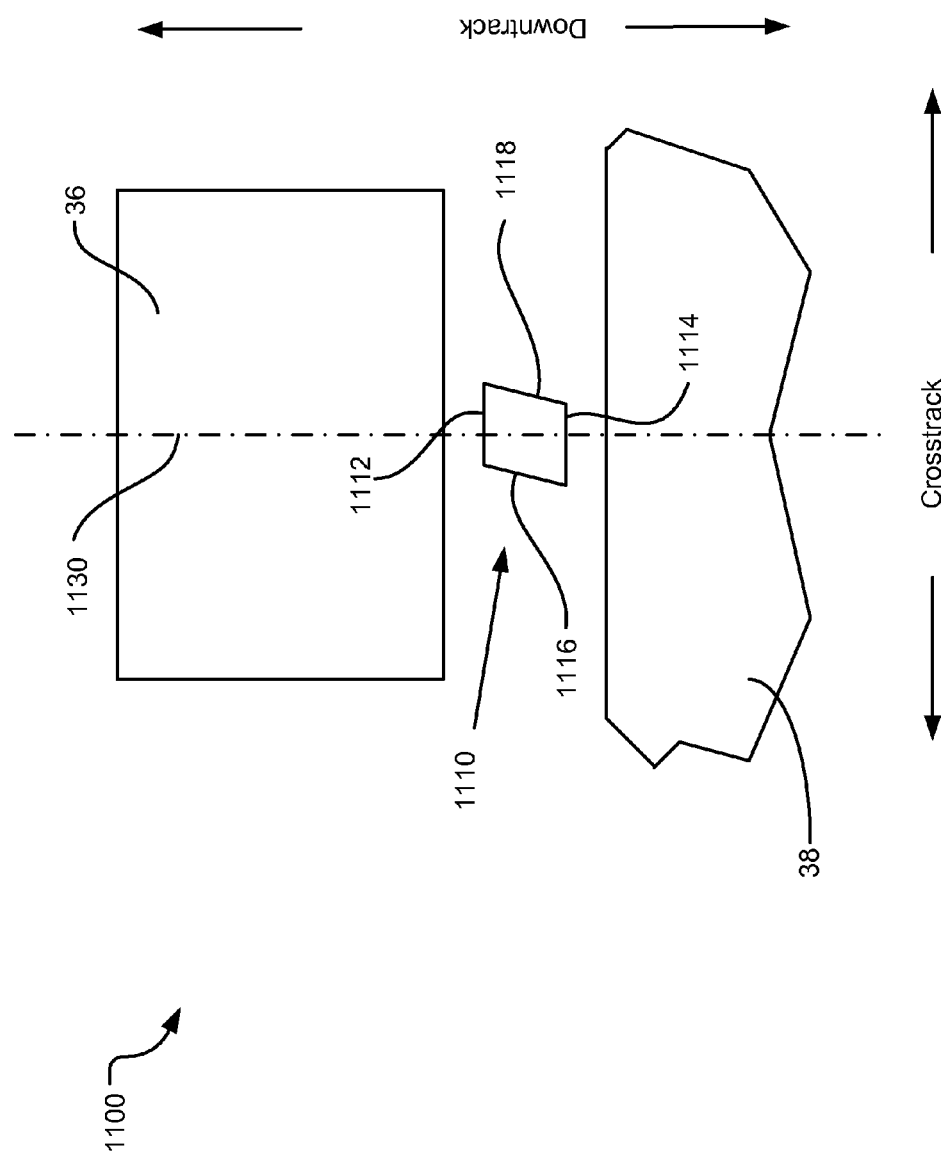
FIG. 11 illustrates an alternative example ABS view of a NFT with a different asymmetric pin disposed between a write pole and a return pole.

FIG. 11 illustrates an alternative example ABS view 1100 of a NFT with a different asymmetric pin disposed between a write pole and a return pole. The ABS view 1100 includes a write pole 36, a return pole 38, and an optical transducer with pin 1110. Specifically, FIG. 11 illustrates the energy-radiating end of the pin 1110. The pin 1110 is between the write pole 36 and return pole 38. Specifically, the energy-radiating end of the pin 1110 includes a first pin edge 1112, a second pin edge 1114, a third pin edge 1116, and a fourth pin edge 1118. The first pin edge 1112 and the second pin edge 1114 are parallel to each other. Similarly, the third pin edge 1116 and the fourth pin edge 1118 are also parallel to each other.

In one implementation, the lengths of the first pin edge 1112 and the second pin edge 1114 are different than the lengths of the third pin edge 1116 and the fourth pin edge 1118. In other words, in such an implementation, the energy-radiating end of the pin 1110 is in the shape of a parallelogram. However, in an alternate implementation, the lengths of the first pin edge 1112 and the second pin edge 1114 are the same as the lengths of the third pin edge 1116 and the fourth pin edge 1118. In other words, in such an implementation, the energy-radiating end of the pin 1110 is in the shape of a rhombus.

Providing an energy-radiating end of the pin 1110 in the shape of a parallelogram or in the shape of a rhombus result in shape anisotropies of the heated spot generated by the energy-radiating end of the pin 1110 in the cross-track direction as well as in the down-track direction. For example, the energy-radiating end of the pin 1110 may generate a thermal spot that is hottest away from the center axis 1130 of the write pole in a cross-track direction. Furthermore, in the implementation disclosed in FIG. 11, the energy position of the radiating-end of the pin 1110 is centered in the cross-track direction around a center axis 1130 of the write pole 36. In other words, the energy-radiating end of the pin 1110 has equal area on both sides of the axis 1130 along the cross-track direction.

In one implementation, the energy-radiating end 1110 may be an energy-radiating end of a lollipop type NFT. Alternatively, the energy-radiating end 1110 may be an energy-radiating end of a coupled nanorod (CNR) type NFT. In such a CNR NFT implementation, the energy-radiating end 1110 of the NFT may be formed by two nanorods with their internal sides parallel to each other but an angle to the surface of the write pole other than a perpendicular angle.

Figure 12:
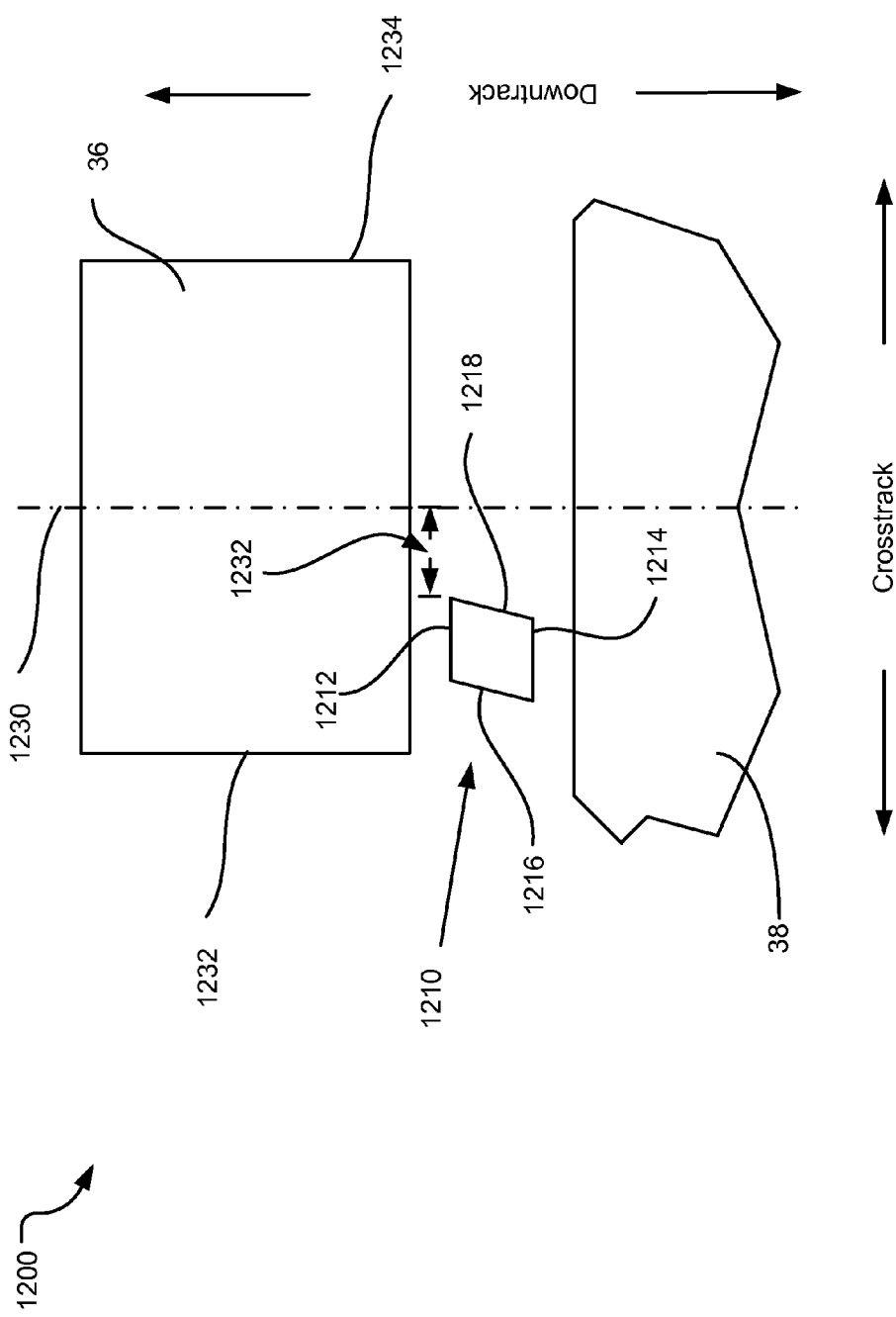
FIG. 12 illustrates an alternative example ABS view of a NFT with a different asymmetric pin disposed between a write pole and a return pole.

FIG. 12 illustrates an alternative example ABS view 1200 of a NFT with a different asymmetric pin disposed between a write pole and a return pole. The ABS view 1200 includes a write pole 36, a return pole 38, and an optical transducer with pin 1210. Specifically, FIG. 12 illustrates the energy-radiating end of the pin 1210. The pin 1210 is between the write pole 36 and return pole 38. Specifically, the energy-radiating end of the pin 1210 includes a first pin edge 1212, a second pin edge 1214, a third pin edge 1216, and a fourth pin edge 1218. The first pin edge 1212 and the second pin edge 1214 are parallel to each other. Similarly, the third pin edge 1216 and the fourth pin edge 1218 are also parallel to each other.

In one implementation, the lengths of the first pin edge 1212 and the second pin edge 1214 are different than the lengths of the third pin edge 1216 and the fourth pin edge 1218. In other words, in such an implementation, the energy-radiating end of the pin 1210 is in the shape of a parallelogram. However, in an alternate implementation, the lengths of the first pin edge 1212 and the second pin edge 1214 are the same as the lengths of the third pin edge 1216 and the fourth pin edge 1218. In other words, in such an implementation, the energy-radiating end of the pin 1210 is in the shape of a rhombus.

Providing an energy-radiating end of the pin 1210 in the shape of a parallelogram or in the shape of a rhombus result in shape anisotropies of the heated spot generated by the energy-radiating end of the pin 1210 in the cross-track direction as well as in the down-track direction. For example, the energy-radiating end of the pin 1210 may generate a thermal spot that is hottest away from the center axis 1230 of the write pole in a cross-track direction. Furthermore, in the implementation disclosed in FIG. 12, the position of the energy radiating-end of the pin 1210 is shifted in the cross-track direction from a center axis 1230 of the write pole 36. In other words, the energy-radiating end of the pin 1210 has unequal area on either sides of the axis 1230 along the cross-track direction. Such positioning of the energy-radiating end of the pin 1210 away from the center axis of the write pole 36 allows shifting the heat spot generated by the energy-radiating end of the pin 1210 along the cross-track direction.

While the implementation of FIG. 12 illustrates the energy-radiating end of the pin 1210 shifted to the left (as looking into the FIG. 12) of the center axis 1230, in an alternative implementation, the energy-radiating end of the pin 1210 may be shifted to the right of the center axis 1230. Furthermore, while in the implementation illustrated in FIG. 12, the energy-radiating end of the pin 1210 is shifted from the center axis 1230 such that the energy-radiating end of the pin 1210 is still between the write pole 36 and the return pole 38, in an alternative implementation, the energy-radiating end of the pin 1210 may be shifted far from the center axis 1230 of the write pole 36 in the cross-track direction such that the energy-radiating end of the pin 1210 may be further away from the edges 1232 or 1234 of the write pole 36. In such an implementation, the energy-radiating end of the pin 1210 may generate a thermal spot that is hottest away from the center axis 1230 of the write pole in a cross-track direction and wherein such a thermal spot is not intersected by the center axis 1230.

In one implementation, the energy-radiating end 1210 may be an energy-radiating end of a lollipop type NFT. Alternatively, the energy-radiating end 1210 may be an energy-radiating end of a coupled nanorod (CNR) type NFT. In such a CNR NFT implementation, the energy-radiating end 1210 of the NFT may be formed by two nanorods with their internal sides parallel to each other but an angle to the surface of the write pole other than a perpendicular angle.

Although the present invention has been described with reference to preferred embodiments, workers skilled in the art will recognize that changes may be made in form and detail without departing from the scope of the invention. The implementations described above and other implementations are within the scope of the following claims.

The invention claimed is:

1. An apparatus comprising:
a write pole;
a near field transducer positioned proximate the write pole, comprising an energy-radiating end, located proximate a recording medium, wherein the energy-radiating end is in the shape of a rhombus.

2. The apparatus of claim 1, wherein the energy-radiating end is centered in a cross-track direction at a center axis of the write pole.

3. The apparatus of claim 1, wherein the energy-radiating end is shifted in a cross-track direction away from a center axis of the write pole.

4. The apparatus of claim 1, further comprising:
a waveguide positioned proximate the write pole that focuses light energy to a focal point, wherein
an energy-receiving end of the near field transducer is near the focal point of the waveguide.

5. The apparatus of claim 1, wherein the energy-radiating end generates a heated spot on a media that is hottest away from the center axis of the write pole in a cross-track direction.

6. The apparatus of claim 1, wherein the energy-radiating end generates a heated spot that is hottest away from the center axis of the write pole in a cross-track direction and wherein the thermal spot is not intersected by a center axis of the write pole.

7. The apparatus of claim 1, wherein the near field transducer is made of one of gold, silver, copper, or their alloys.

8. The apparatus of claim 2, wherein the near field transducer is a lollipop type transducer.

9. The apparatus of claim 6, wherein the energy-receiving end generates a heated spot that is hottest away from the center axis of the write pole in a cross-track direction.

10. The apparatus of claim 1, wherein the energy-receiving end generates a heated spot that is hottest away from the center axis of the write pole in a cross-track direction and wherein the thermal spot is not intersected by a center axis of the write pole.

11. The apparatus of claim 2, wherein the energy-receiving end of the coupled nanorod transducer is a coupled nanorod entrance.

12. The apparatus of claim 11, wherein the energy-radiating end includes a gap profile between two nanorod tips.

13. A system comprising:
a write pole;
a waveguide located proximate the write pole that focuses light energy to a focal point;
a recording medium disposed beneath the write pole and waveguide; and
a near field transducer positioned proximate the write pole, comprising an energy-radiating end, located proximate the recording medium, wherein the energy-radiating end is in the shape of a rhombus.

14. The system of claim 13, wherein the energy-radiating end is centered in a cross-track direction at a center axis of the write pole.

15. The system of claim 13, wherein the energy-radiating end is shifted in a cross-track direction away from a center axis of the write pole.

16. The system of claim 13, wherein energy-radiating end generates a heated spot on a media that is hottest away from the center axis of the write pole in a cross-track direction.

17. The system of claim 13, wherein the energy-receiving end generates a heated spot that is hottest away from the center axis of the write pole in a cross-track direction and wherein the thermal spot is not intersected by a center axis of the write pole.

18. An apparatus comprising:
a write pole;
a waveguide located proximate the write pole that focuses light energy to a focal point;
a recording medium disposed beneath the write pole and waveguide; and
a near field transducer positioned proximate the write pole, comprising an energy-radiating end, located proximate the recording medium, wherein the energy-radiating end is in the shape of a concave trapezoid.

19. The apparatus of claim 18, wherein the near field transducer is made of gold, silver, copper or their alloys and the energy receiving end is trapezoidal shaped.

20. The apparatus of claim 18, wherein the energy-radiating end is shaped to create a thermal spot that has a hottest area closer to a write pole profile on the recording medium than to a return pole profile on the recording medium.

21. The apparatus of claim 18, wherein the energy-radiating end has a curved edge closer to a return pole.

22. The apparatus of claim 18, wherein only one edge of the trapezoidal-shaped energy-radiating end is concave.

* * * * *